Patented Mar. 1, 1938

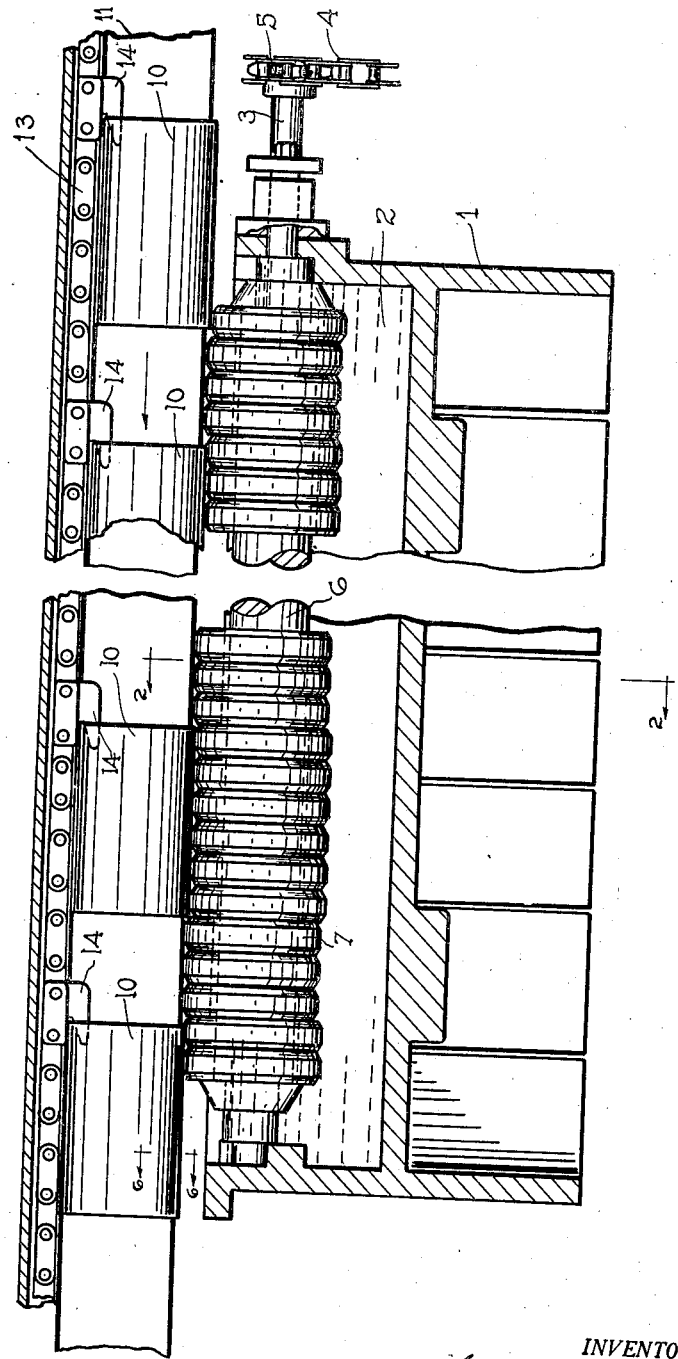

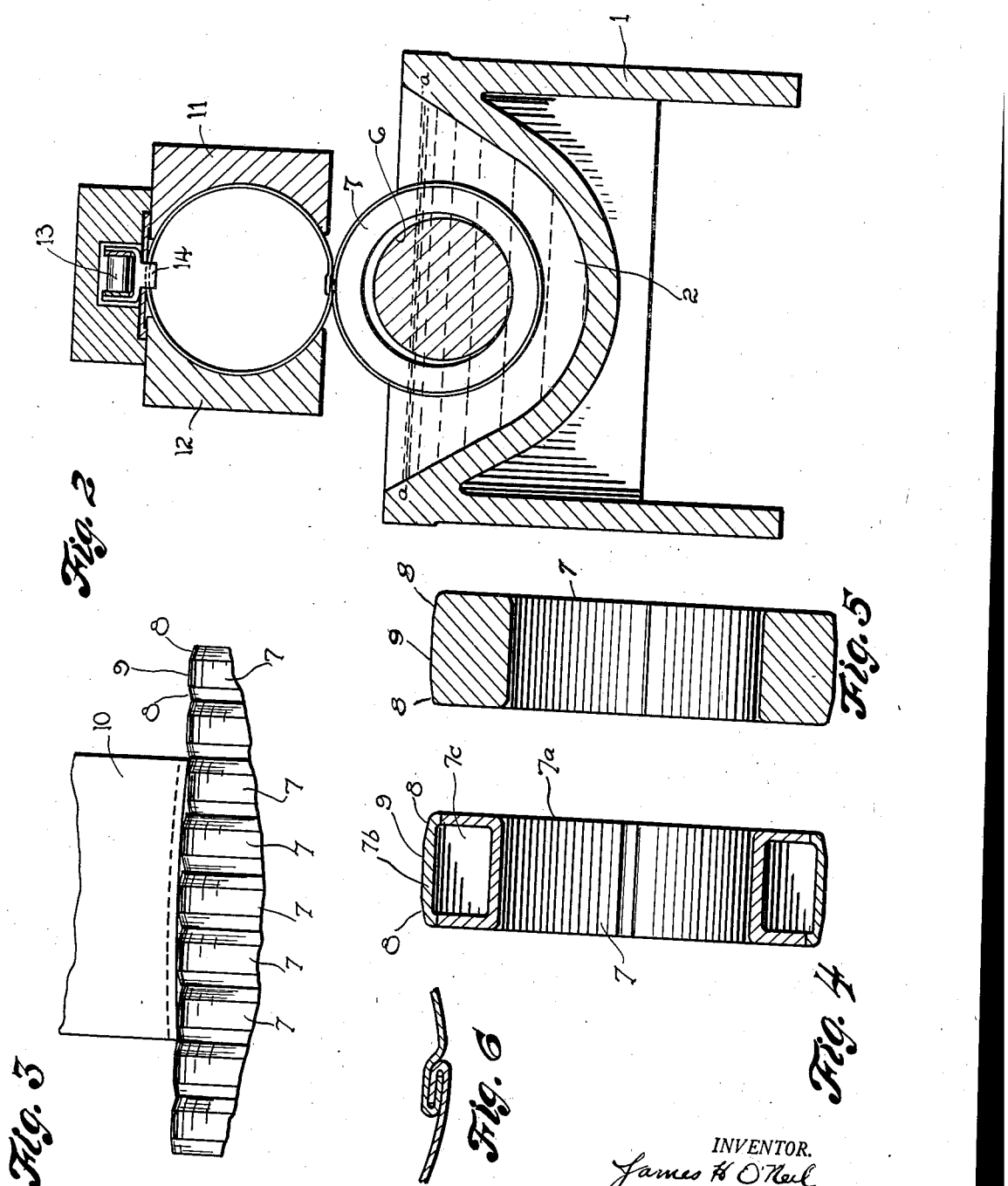

2,109,800

UNITED STATES PATENT OFFICE 2,109,800

SOLDERING MECHANISM FOR CAN BODIES

James H. O'Neil, Syracuse, N. Y., assignor to Continental Can Company, Inc., New York, N. Y., a corporation of New York Application July 31, 1935, Serial No. 34,091

6 Claims. (Cl. 113—61)

The invention relates to new and useful improvements in a soldering mechanism for applying solder to the side seam of a can body.

An object of the invention is to provide a soldering mechanism wherein the solder applying roll is made in separate sections mounted so as to move vertically under contact with the can body thereon.

A further object of the invention is to provide a solder roll of the above type wherein the sections are of such width as to contact with the side seam simultaneously at a plurality of points.

In the drawings—

Figure 1 is a view in vertical section and showing more or less diagrammatically the soldering mechanism embodying the invention;

Fig. 2 is a vertical sectional view on the line 2—2 of Fig. 1;

Fig. 3 is an enlarged detail showing a portion of the solder roll and a can body contacting therewith, and Fig. 4 is a transverse view through one of the solder applying sections.

Fig. 5 shows in cross section a modified form of solder ring which is solid.

Fig. 6 shows in cross section the form of the side seam of the can.

The invention is directed to a solder applying mechanism for solder bonding the side seam of a can body. When the hot solder is applied to the side seam of a can body, it causes said side seam to bow, due to the fact that the can body is only heated in the region of the side seam. The pre-heating of the side seam preparatory to soldering further adds to the curving of the side seam. Considerable difficulty has been found in bringing about a contact between the solder roll and the side seam uniform throughout, due to this curving of the side seam under heat. The present invention has to do with the construction of a solder roll which will make uniform contact with the side seam throughout the entire length thereof. The solder roll consists of a series of separate rings which are mounted on a supporting shaft disposed relative to the solder bath so that the rings are partly immersed in the solder bath. The rings in the present embodiment of the invention are preferably hollow. The rings are also of larger internal diameter than the shaft on which they are mounted, and therefore, the molten solder will cause the rings to move upward limited in their upward movement by the shaft on which they are supported when there is no can body passing across the same. When the can body contacts with the rings it depresses the same, and therefore, the rings are positioned in the solder bath by their contact with the can body. There are a series of rings which are of considerably less width than the length of a side seam, and therefore, there are several rings which simultaneously contact with the side seam, and they will uniformly bear against the side seam, notwithstanding that it is curved under the heat applied thereto.

Referring more in detail to the drawings, the invention is shown as applied to a soldering mechanism which includes a supporting frame 1 providing a receptacle for a solder bath 2. Mounted for rotation on the frame 1 is a shaft 3. This shaft extends through suitable bearings in the end members of the frame and the shaft is driven by a sprocket chain 4 running over a sprocket wheel 5 attached to the shaft. This shaft within the tank is made of slightly larger diameter as indicated at 6. On this portion 6 of the shaft is a series of solder applying rings or sections 7. Each solder ring consists of an inner part 7a which is U-shape in cross section, and an outer portion 7b. These two portions are preferably welded together, thus forming a center chamber 7c which is liquidtight. The outer face of the ring 7 at each side thereof is tapered as indicated at 8, 8. The central portion is flat as indicated at 9. These rings are of larger internal diameter than the portions 6 of the shaft on which they are mounted, as shown in Figure 2. The molten solder in the bath is maintained at a substantially fixed level which is indicated by the line $a$, $a$ in Figure 2. The ring being hollow will float in the solder bath or be lifted by the solder bath until the ring contacts with the lower side of the portion 6 of the shaft. This is when there is no can body contacting with the ring.

The can bodies to be soldered are indicated at 10 in the drawings. The can bodies pass through a horse including sections 11 and 12, and are moved through the horse by a traveling chain 13 carrying a series of dogs 14. This means for conveying a can body through the soldering mechanism is of a well-known type and further description thereof is not thought necessary. The can bodies move in the direction of the arrow (Fig. 1). These solder applying sections or rings 7 are of considerably less width than the length of the side seam, so that a plurality of sections will contact with the can body at the same time. As viewed in Fig. 1, the can body at the right has moved into contact with the first ring and has depressed said ring. As the can body continues its movement, it will contact with the tapered face 8 of the next succeeding ring, and will force said ring downward in the solder bath. Inasmuch as these ring sections are free to move independently and are limited in their upward movement by contact with the can body, it will be apparent that the sections are raised to different heights so as to contact with the seam which is curved by the pre-heating of the can body along the side seam and the heat of the solder as it is applied to the side seam. This makes a uniform contact between the solder roll and the side seam throughout the entire length thereof, with a much more efficient formation of solder bond. The solder rings will, of course, be carried into contact with the portion 6 of the shaft when the can body is out of contact therewith. The rings just beyond the ends of the can and not contacting with the can, as viewed in Figure 3, will be raised into contact with the shaft and will be rotated by the shaft. If the curvature of the seam is that indicated in Figure 3, the ring contacting with the center of the side seam will also be carried up into contact with the shaft. The rings contacting with the side seam adjacent the ends of the side seam will be forced down until they contact with the upper side of the shaft, or substantially so, so that these rings will be rotated by the shaft. It should be borne in mind that the rings float in the fluid solder and the solder passes between the rings and into the space between the shaft and the rings, and this aids in the forming of a frictional drive between the shaft and the rings. Furthermore, the rings are very close together and are forced into side contact by the endwise movement of the can so that the ring outside of the advance end of the can is rotated by the shaft and will impart rotation to the rings adjacent thereto. This side contact, together with the fluid solder that is within the rings and between the rings, brings about a practical positive rotation of the rings, regardless of whether they are floated into contact with the lower side of the shaft or forced downward slightly out of contact with the lower side of the shaft by the passing can body. It should be borne in mind that the can bodies travel over the solder bath at the rate of some four or five per second, and therefore, there is hardly time for a ring which is being rotated to stop rotation before the can passes, if there was no continuous driving force on the ring; but as above noted, there is a constant force acting on the rings to rotate the same as the can bodies pass over the same.

While the solder ring is shown as hollow for the purpose of floating the same into contact with the side seam, it is understood that other ways may be provided for yieldingly and rotatively mounting the sections of the solder roll which contact with the can body.

Illustrated in Fig. 5 for example is shown a modified form of solder ring which is solid in cross section. This ring may be made of aluminum or any other metal sufficiently light to float upon the solder bath. The inner diameter and the outer contour of this form of ring should however be the same as that of the hollow ring described as the preferred form of the invention and would accomplish the same result in applying solder to the side seam of the container.

Having thus described the invention, what I claim as new and desire to secure by Letters Patent, is—

1. A soldering mechanism including a solder bath, a solder applying roll rotating in said bath, means for feeding cans along said roll for applying solder to the side seam, said solder roll including a central rotating portion, a series of rings mounted on said rotating portion and operating to apply solder to the side seam, said rings being of greater inside diameter than the portion on which they are mounted, said rings being disposed in said bath so as to float therein and yield independently when contacted with by the can body.

2. A soldering mechanism including a solder bath, a solder applying roll rotating in said bath, means for feeding can bodies along said roll for applying solder to the side seam, said solder roll including a central rotating portion, a series of hollow rings mounted on said rotating portion and operating to apply solder to the side seam, said rings being of a greater inside diameter than the portion on which they are mounted so that said rings will float in the solder bath and yield when contacted by said can body.

3. A soldering mechanism including a solder bath, a solder applying roll rotating in said bath, means for feeding can bodies along said roll for applying solder to the side seam, said solder roll including a plurality of ring sections mounted so as to yield independently to the contact of the can body, each section having a maximum outside diameter intermediate the side edges thereof and with the surface between the maximum diameter and the side of the section approached by the can gradually tapered to a minimum outside diameter at the side edge.

4. A soldering mechanism including a solder bath, a solder applying roll rotating in said bath, means for feeding can bodies along said roll for applying solder to the side seam, said solder roll including a central rotating portion, a series of hollow rings mounted on said rotating portion and operating to apply solder to the side seam, said rings being of a greater inside diameter than the portion on which they are mounted so that said rings will float in the solder bath and yield when contacted with by said can body, each ring having a maximum outside diameter intermediate the side edges thereof and with the surface between the maximum diameter and the side of the ring approached by the can gradually tapered to a minimum diameter at the side edge.

5. A soldering mechanism including a solder bath, a solder applying roll rotating in said bath, means for feeding can bodies along said roll for applying solder to the side seam, said solder roll including a plurality of ring sections mounted so as to yield independently to the contact of the can body, each section having the peripheral surface thereof shaped so as to provide a maximum outside diameter in the region centrally between the side edges of the section, with said surface tapering from the section of maximum outside diameter to a minimum outside diameter at the respective side edges of the section.

6. A soldering mechanism including a solder bath, a solder applying roll rotating in said bath, means for feeding can bodies along said roll for applying solder to the side seam, said solder roll including a central rotating portion, a series of hollow rings mounted on said rotating portion and operating to apply solder to the side seam, said rings being of a greater inside diameter than the portion on which they are mounted so that said rings will float in the solder bath and yield when contacted with by said can body, each section having the peripheral surface thereof shaped so as to provide a maximum outside diameter in the region centrally between the side edges of the section, with said surface tapering from the section of maximum outside diameter to a minimum outside diameter at the respective side edges of the section.

JAMES H. O'NEIL.